(12) United States Patent
Ando et al.

(10) Patent No.: US 6,862,168 B2
(45) Date of Patent: Mar. 1, 2005

(54) ORGANIC ELECTROLYTE CAPACITOR

(75) Inventors: Nobuo Ando, Yamaguchi (JP); Shinichi Tasaki, Yamaguchi (JP); Hiromoto Taguchi, Yamaguchi (JP); Yukinori Hato, Yamaguchi (JP)

(73) Assignee: Kanebo, Limited, Tokyo (JP)

( * ) Notice: Subject to any disclaimer, the term of this patent is extended or adjusted under 35 U.S.C. 154(b) by 0 days.

(21) Appl. No.: 10/481,481
(22) PCT Filed: Mar. 29, 2002
(86) PCT No.: PCT/JP02/03227

§ 371 (c)(1),
(2), (4) Date: Dec. 17, 2003

(87) PCT Pub. No.: WO03/003395

PCT Pub. Date: Jan. 9, 2003

(65) Prior Publication Data

US 2004/0179328 A1 Sep. 16, 2004

(30) Foreign Application Priority Data

Jun. 29, 2001 (JP) ........................................ 2001-200213

(51) Int. Cl.$^7$ ................................................ H01G 9/02
(52) U.S. Cl. ........................ 361/504; 361/508; 361/516; 361/525; 361/528
(58) Field of Search ................................. 361/504, 508, 361/516, 523, 528, 532; 429/192

(56) References Cited

U.S. PATENT DOCUMENTS

| | | | | |
|---|---|---|---|---|
| 4,822,701 A | * | 4/1989 | Ballard et al. | 429/313 |
| 5,455,999 A | * | 10/1995 | Weiss et al. | 29/623.1 |
| 5,953,204 A | | 9/1999 | Suhara et al. | |
| 6,043,975 A | * | 3/2000 | Kanbara et al. | 361/502 |
| 6,765,785 B2 | * | 7/2004 | Honda et al. | 361/525 |

* cited by examiner

*Primary Examiner*—Anthony Dinkins
(74) *Attorney, Agent, or Firm*—Flynn, Thiel, Boutell & Tanis, P.C.

(57) ABSTRACT

A organic electrolytic capacitor comprising a positive electrode, a negative electrode and an aprotic organic solvent of a lithium salt as an electrolytic solution, wherein a positive electrode active material is capable of reversibly holding lithium ions and anions, a negative electrode active material is capable of reversibly holding lithium ions, the negative electrode active material has three times or more capacitance per unit weight as the positive electrode active material, the weight of the positive electrode active material is larger than the weight of the negative electrode active material, and the negative electrode is provided with lithium deposited thereon in advance. Ease of manufacture, high capacity and high withstanding voltage are achieved with this constitution.

13 Claims, 5 Drawing Sheets

ORGANIC ELECTROLYTE CAPACITOR

TECHNICAL FIELD

The present invention relates to an organic electrolytic capacitor having high voltage, high energy density, high output characteristic and high safety.

BACKGROUND ART

Secondary battery comprising a positive electrode made of an electrically conductive polymer, an oxide of a transition metal or the like and a negative electrode made of metal lithium or a lithium alloy have been proposed for use in place of Ni—Cd battery and lead acid battery, to take advantage of high energy density.

These secondary batteries, however, have such a problem that the capacity drops significantly due to deterioration of the positive electrode or the negative electrode after repeated charges and discharges, resulting in performance unsatisfactory for practical use. Deterioration of the negative electrode, in particular, is accompanied by the generation of lichen-like lithium crystal called dendrite, that eventually penetrates a separator as charge and discharge cycles are repeated, resulting in short-circuiting in the battery and, in some cases, leads to a safety problem such as the explosion of the battery.

For the purpose of solving the problems described above, such a battery has been proposed as a carbon material such as graphite is used as the negative electrode and a metal oxide including lithium such as $LiCoO_2$ is used as the positive electrode. This battery is the so-called rocking chair type battery which is charged after being assembled so as to supply lithium from the metal oxide including lithium of the positive electrode to the negative electrode and return lithium from the negative electrode to the positive electrode during discharge, and is called the lithium ion secondary battery distinguishing it from the lithium battery that employs metal lithium, since only lithium ions are involved in the charge and discharge processes, without using metal lithium in the negative electrode. This battery is characterized by high voltage, high capacity and high safety.

However, cycle life of the lithium ion secondary battery is said to be about 1000 cycles, since the metal oxide including lithium used as the positive electrode active material and graphite used as the negative electrode active material repeat expansion and contraction every time the battery is charged and discharged. Also because graphite of the negative electrode has a layered structure, response of lithium ions to quick charge or discharge (charge/discharge with a large current) is slow and metal lithium may precipitate on the surface of the negative electrode graphite during charging which poses a danger. Consequently, the separator is required to have a certain level of strength which is determined by needle piercing test. Efforts are also made in relation to the circuit so as to prevent large current from flowing.

The lithium ion secondary battery is used mainly in cellular phones and laptop computers, and is under demand to further increase the energy density. Measures studied for this purpose are mainly to increase the discharge capacity of the positive electrode and the negative electrode, improve the charge and discharge efficiency and increase the electrode density. When designing a cell in general, the thickness and density of each electrode are determined so that the charge stored in the positive electrode and the charge stored in the negative electrode become equal. As a result, discharge capacity of the cell is determined by the charge and discharge efficiency of the positive electrode or the negative electrode, whichever the lower, so that the higher the charge and discharge efficiency, the larger the cell capacity.

The present inventors are developing a lithium ion secondary battery that employs a polyacene-based organic semiconductor (hereinafter referred to as PAS), and have invented a secondary battery having a high energy density by the method disclosed in Japanese Unexamined Patent Publication (Kokai) No. 6-203833. The PAS used in the negative electrode of the present invention has higher capacity than a negative electrode made of graphite, but has charge and discharge efficiency as low as 60% to 80% which makes it impossible to achieve a high capacity of the cell by the same design method as that of the ordinary lithium ion secondary battery. Accordingly, the present inventors have achieved a higher capacity by causing lithium to be deposited on the negative electrode PAS in advance by the method disclosed in Japanese Unexamined Patent Publication (Kokai) No. 8-7928.

In the case of ordinary design, 100% of the negative electrode capacity can be utilized but only about 60% to 80% of the positive electrode capacity can be utilized. By having lithium deposited on the negative electrode PAS in advance, it is made possible to utilize 100% of the discharge capacity of both the positive electrode and the negative electrode, thus achieving higher capacity. At the 35th Battery Conference held in November 1994, the present inventors reported a lithium ion secondary battery having energy density as high as 450 Wh/l achieved by this method.

Recently as the environmental problems attract the public concerns, vigorous efforts have been made to develop renewable energy storage systems based on solar or wind power generation, distributed power sources intended to level off the load on the electric power supply, and power sources (main source and auxiliary source) for electric automobiles that would replace the gasoline-powered automobiles. While lead acid batteries have been used to power the electrical devices of the automobile, new power sources are called for in view of energy density and output power density, as the automobile comes to be equipped with ever increasing electric devices such as power window and stereo.

The lithium ion secondary battery described above has been researched as a promising power source having high capacity and there are already some products having been commercialized, but there remain problems related to safety, cycle life and output characteristic. Therefore, electric double layer capacitor (the rest is shortened to EDLC) has also been attracting attention. The EDLC is an electric device widely used as the power source for memory backup of IC and LSI, and is considered to have a position somewhere between the battery and the capacitor. The EDLC employs polarizing electrode based mainly on active carbon for both the positive electrode and the negative electrode, and is characterized primarily by high output characteristic and maintenance-free performance which are not achieved by the lithium ion battery and the nickel-hydrogen battery, as the EDLC has excellent instantaneous charge and discharge characteristic, although the discharge capacity per one charge is lower than that of a battery, and can endure ten to hundred thousand cycles of charge and discharge.

Although researches are being made on the application of the EDLC to the electric vehicle by taking advantage of the above-mentioned merits, it has not reach the practical level since typical energy density of the EDLC is around 3 to 4

Wh/l which is smaller by two factors than that of the lithium ion battery. It is said that energy density must be 6 to 10 Wh/l to be considered practical, and 20 Wh/l to become popular, for the application of the EDLC to the electric vehicle (Fujio MATSUI, 39th Electrical Chemistry Seminar, November 1999).

Capacitance C of the EDLC is given by $C=\int \epsilon/(4\pi\delta)dS$, where $\epsilon$ is the dielectric constant of the electrolytic solution, $\delta$ is the distance from the electrode interface to the ion center, and S is the surface area of the electrode interface. In order to make a capacitor having a high capacity and solve the problems described above, it is most important to pack a large amount of active material in a cell, namely to increase the bulk density of the electrode, and increase the specific surface area of the active material as will be evident from the equation shown above. However, there is a limit to the effect of increasing in the capacity by optimizing the micro-pore structure of the active material, since the specific surface area and the bulk density are inversely proportional to each other.

Another approach that can be conceived for increasing the capacity is setting the charge voltage higher. While the EDLC is charged typically at 2.5 V, energy density can be increased if the capacitor can be charged with ahigher voltage. If the capacitor can be charged at 3.3 V, for example, energy density can be increased 1.7 times since the amount of energy is proportional to the square of voltage. When the charge voltage is set higher, however, charge voltage of the positive electrode increases and causes the electrolytic solution to be oxidized and decompose, resulting in shorter lifetime and higher internal resistance due to the generation of gas, deterioration of the electrode and other cause, thus losing the advantages of the EDLC.

In the meantime, the present inventors have developed a capacitor that employs PAS for the positive electrode and the negative electrode and has been commercialized. Although this capacitor has a capacity higher than that of EDLC that employs active carbon, it does not satisfy the requirements for capacity required in the application to the electric vehicle.

The present inventors have also commercialized a coin type PAS capacitor which employs PAS having lithium deposited on the negative electrode in advance and has nominal voltage of 3.3 V.

However, this capacitor does not provide sufficiently high capacity despite the design to increase the withstanding voltage of a capacitor having 2.5 V specification to 3.3 V.

Specifically, capacitance of the 3.3 V class PAS capacitor that has been commercialized is comparable to that of the aforementioned capacitor (2.5 V) that employs PAS in the positive electrode and the negative electrode (for example, PAS621 which is a coin type capacitor comprising positive electrode and negative electrode that are made of PAS and a cell that is 6 mm in diameter and 2.1 mm in height has capacity of 0.3F, while PAS621L of the same size which employs positive electrode made of PAS and negative electrode made of PAS having lithium deposited thereon in advance has capacity of 0.36F, only 1.2 times the former), and has low output characteristic, thus unable to solve the aforementioned problems.

DISCLOSURE OF THE INVENTION

In light of the problems described above, the present inventors have intensively studied and completed the present invention and an object thereof is to establish a method for achieving high capacity and high withstanding voltage with easy manufacturing process and to provide an organic electrolytic capacitor having such performance.

Another object of the present invention is to provide an organic electrolytic capacitor having excellent charge and discharge characteristic. Further another object of the present invention is to provide an organic electrolytic capacitor that is capable of repeating charge and discharge operations over an extended period of time and is excellent in safety. Further another object of the present invention is to provide an organic electrolytic capacitor that has a low internal resistance. Further another object of the present invention is to provide an organic electrolytic capacitor that can be manufactured easily. Other objects of the present invention will become apparent from the description that follows.

In order to achieve the objects described above, the organic electrolytic capacitor of the present invention employs such a method and constitution as described below. The organic electrolytic capacitor comprises a positive electrode, a negative electrode and an aprotic organic solvent of lithium salt used as the electrolytic solution, wherein the positive electrode active material is capable of reversibly holding lithium ions and anions, the negative electrode active material is capable of reversibly holding lithium ions, the negative electrode active material has three times or more capacitance per unit weight as the positive electrode active material, the weight of the positive electrode active material is larger than the weight of the negative electrode active material, and the negative electrode is charged with lithium deposited thereon in advance. Vigorous efforts have been made for improving secondary batteries and capacitors so as to enable application to electric vehicles. Improvements of secondary batteries, mainly lithium ion secondary battery, are focused on improving the output characteristic at the cost of energy density such as decreasing the thickness of the electrodes and increasing the number of terminals. Improvements of capacitors, on the other hand, aims at increasing the energy density at the cost of the output characteristic by making the electrodes thicker thereby increasing the weight of the active material packed in a cell.

The organic electrolytic capacitor of the present invention has been developed on a concept different from that of the lithium ion secondary battery and capacitor described above, and achieves an increase in the energy density with the output characteristic of the capacitor remaining the same.

Generally a capacitor uses substantially the same quantities of active material such as active carbon in the positive electrode and the negative electrode. The active material used in the positive electrode and the negative electrode has a potential of about 3 V (Li/Li$^+$) (potential will be hereinafter given as normalized by lithium potential) at the time of assembling the cell. When charged, anions form an electrical double layer on the positive electrode surface so as to increase the potential of the positive electrode, while cations form an electrical double layer on the negative electrode surface so as to decrease the potential of the negative electrode. When discharged, conversely, anions are released from the positive electrode and cations are released from the negative electrode into the electrolytic solution, with the potential decreasing and increasing, respectively, to recover the value of around 3 V. This means that charge and discharge curves of the positive electrode and the negative electrode are symmetrical with each other with respect to a vertical line located at 3 V, so that the variation in potential of the positive electrode and the variation in potential of the negative electrode are substantially equal to each other. Movement of the electrical charge is limited almost to the exchange of anions in the positive electrode and exchange of cations in the negative electrode.

In the meantime the capacitor of the present invention employs such an active material for the positive electrode that is capable of reversibly holding lithium ions and anions, which contains active carbon used in the positive electrode and the negative electrode of the conventional EDLC. An aprotic organic solvent of a lithium salt is used as the electrolytic solution, and the negative electrode active material has three times or more capacitance per unit weight as the positive electrode active material, while the weight of the positive electrode active material is larger than the weight of the negative electrode active material, and the negative electrode is provided with lithium deposited thereon in advance.

In this patent specification, capacitance and capacity are defined as follows. Capacitance of a cell is the gradient of the discharge curve of the cell, in the unit of F (farad). Capacitance per unit weight of the cell is the capacitance of the cell divided by the total weight of the positive electrode active material and the negative electrode active material packed in the cell, and is given in the unit of F/g. Capacitance of the positive electrode is the gradient of the discharge curve of the positive electrode, in the unit of F. Capacitance per unit weight of the positive electrode is the capacitance of the positive electrode divided by the weight of the positive electrode active material packed in the cell, given in the unit of F/g. Capacitance of the negative electrode is the gradient of the discharge curve of the negative electrode, given in the unit of F. Capacitance per unit weight of the negative electrode is the capacitance of the negative electrode divided by the weight of the negative electrode active material packed in the cell, given in the unit of F/g.

Cell capacity is the product of the difference between the cell voltage at the start of discharge and the cell voltage at the end of discharge, namely the variation in voltage, and the capacitance of the cell, given in the unit of C (Coulomb), while 1C is the amount of electric charge that is carried by the current of 1 A in one second, and is therefore converted and given in mAh in this specification. Positive electrode capacity is the product of the difference between the positive electrode potential at the start of discharge and the positive electrode potential at the end of discharge (variation in positive electrode potential) and the capacitance of the positive electrode, given in the unit of C or mAh, and negative electrode capacity is the product of the difference between the negative electrode potential at the start of discharge and the negative electrode potential at the end of discharge (variation in negative electrode potential) and the capacitance of the negative electrode, given in the unit of C or mAh. The cell capacity, positive electrode capacity and negative electrode capacity correspond to each other.

Materials which have capacitance three times or more higher as the capacitance per unit weight of the positive electrode include PAS. The present inventors found that capacitance of 650 F/g or higher can be achieved by providing (charging) PAS with 400 mAh/g of lithium ions and discharging it, and capacitance of 750 F/g or higher can be achieved by charging with 500 mAh/g or more lithium ions.

Since capacitance per unit weight of the positive electrode and the negative electrode of the common EDLC are in a range from 60 to 200 F/g, it can be appreciated that capacitance of PAS is remarkably high. Such a combination provides the highest effect and is preferable as capacitance of not less than three times the capacitance per unit weight of the positive electrode is secured and the weight of the positive electrode active material is larger than the weight of the negative electrode active material, selected by taking into consideration the capacitance of the positive electrode that is used and properly controlling the amount of lithium ions charged onto the negative electrode.

In case capacitance per unit weight of the negative electrode is less than three times the capacitance per unit weight of the positive electrode, the increase in the capacity is less than that achieved by the conventional EDLC that uses substantially the same quantities of active material in the positive electrode and the negative electrode, and the conventional EDLC of simple cell constitution is considered to be more advantageous.

Even when capacitance per unit weight of the negative electrode is three times or more than the capacitance per unit weight of the positive electrode, the increase in the capacity is still less than that achieved by the conventional EDLC if the weight of the positive electrode active material is less than the weight of the negative electrode active material, and the object of the present invention cannot be achieved.

The cell construction of the present invention achieves higher capacity by taking advantage of the three effects described below.

First effect is the increase in the quantity of positive electrode active material and corresponding increases in the capacitance and capacity of the cell that are achieved by using the negative electrode which has larger capacitance per unit weight than capacitance per unit weight of the positive electrode, thereby enabling it to decrease the weight of the negative electrode active material without changing the potential change of the negative electrode. With another design, potential change of the negative electrode becomes smaller due to high capacitance of the negative electrode, resulting in larger potential change of the positive electrode and hence higher capacitance and higher capacity of the cell.

Second effect is that the negative electrode potential becomes lower than 3 V in contrast to the positive electrode potential being about 3 V when the cell is assembled, as the negative electrode is charged with a predetermined quantity of lithium ions in advance so as to obtain the required capacity of the negative electrode.

The phrase "the negative electrode has lithium ions deposited thereon in advance" in this specification means that the negative electrode already holds lithium ions charged thereon before charging the battery, and does not refer to lithium ions that are supplied from the electrolytic solution during charge or discharge. The method of charging the negative electrode with lithium ions will be described later.

Voltage achieved by increasing the voltage till the electrolytic solution decomposes in oxidative destruction is substantially determined by the positive electrode potential. The capacitor of the present invention having lithium ions deposited thereon in advance has higher withstanding voltage than a capacitor of the conventional cell construction(for example EDLC), due to the lower negative electrode potential. In other words, constitution of the present invention enables it to set the operating voltage to 3 V or higher and increase the energy density, compared to the operating voltage of 2.3 to 2.7 V in the conventional capacitor.

Third effect is the increase in the positive electrode capacity due to the lower negative electrode potential. As the negative electrode potential is lower, it is made possible to further increase the potential variation in the positive electrode through discharge. Depending on the design, positive electrode potential decreases below 3 V near the end of discharge, and the discharge potential can be decreased to around 2 V (anions are released during discharge at voltages down to 3 V, and doping with lithium ions occurs at voltages below 3 V, resulting in decreasing potential).

In the conventional EDLC, positive electrode potential does not decrease to below about 3 V during discharge, because the negative electrode potential reaches 3 V too when the positive electrode potential has decreased to 3 V, thus making the cell voltage 0 V. This means that the constitution of the present invention wherein the positive electrode potential can decrease to 2 V provides higher capacity than the constitution of the conventional EDLC in which the positive electrode potential can decrease only to 3 V.

The capacitor of the present invention has such a cell structure as the positive electrode and the negative electrode are wound or stacked in three or more layers, which provides a large electrode area per unit volume of the cell, and consequently a high-voltage capacitor having large output power can be made unlike the coin type battery.

There is no limitation to the method of depositing lithium on the negative electrode, and such a method may be employed as a cell having an opposing electrode made of metal lithium is built separately from the battery cell, and the negative electrode is provided with a predetermined amount of lithium ions deposited thereon. As an industrially convenient method, metal lithium and negative electrode disposed in the cell may be brought into contact with each other in an electrochemical manner. In this case, it is preferable to use members having holes that penetrate through the thickness of the member such as expanded metal used for the positive electrode charge collector and the negative electrode collector, since it allows it to smoothly deposit lithium ions through electrochemical contact of the metal lithium and the negative electrode.

It is further preferable to dispose metal lithium to oppose the negative electrode or the positive electrode, which enables it to smoothly deposit lithium ions. Metal lithium may be laminated over the entire surface of the negative electrode, although when the electrode is made to be small in thickness so as to obtain high output characteristic, the metal lithium to be laminated should also be thinner which makes it difficult to handle and unsuitable in view of the manufacturing process. For this reason, it is more preferable to wind or stack the electrode and then deposit metal lithium on part of the electrode such as the outermost surface, which makes the manufacturing process more convenient.

When the positive electrode collector is coated with an electrically conductive material based on carbon, contact resistance with the positive electrode active material decreases and high output characteristic can be obtained. When a member having holes that penetrate through the thickness thereof such as expanded metal is used for the positive electrode collector, for example, it is very difficult to coat with the electrically conductive material. However, similar effect can be achieved by punching or expanding a foil after coating it with the electrically conductive material so as to form through holes.

Similarly to the positive electrode collector, the negative electrode collector may also be coated with an electrically conductive material based on carbon, so that contact resistance with the negative electrode active material decreases and high output characteristic is obtained. Similar effect can be achieved by punching or expanding a foil after coating it with the electrically conductive material so as to form through holes, which is convenient in view of manufacturing.

It is a common practice, when winding or stacking the positive electrode and the negative electrode with a separator interposed therebetween to form a capacitor, to secure the capacitor by taping over the outermost surface. When lithium is deposited on the outermost surface of the capacitor according to the present invention, lithium ions deposited on the tape cannot be charged onto the negative electrode or take a long time to charge, and therefore the ions must be deposited in areas not covered by the tape. Instead, it is preferable to use a porous tape for securing, which makes it possible to smoothly charge even when metal lithium is deposited on the tape, and increases the degree of freedom in positioning the metal lithium.

There is no limitation to the positive electrode active material, as long as it can reversibly hold lithium ions and anions such as tetrafluoroborate. For example, an active material, an electrically conductive polymer or a polyacene-based material can be used. Among these materials, it is preferable in view of achieving a high capacity to use an insoluble and infusible substrate (PAS) that is obtained by applying a heat treatment to an aromatic condensation polymer and has a polyacene skeletal structure in which a ratio of hydrogen atoms to carbon atoms is in a range from 0.50 to 0.05.

There is no limitation to the negative electrode active material used in the organic electrolytic capacitor of the present invention as long as it can reversibly hold lithium ions. For example, graphite, various carbon materials, polyacene-based material, tin oxide, silicon oxide or the like can be used.

When an active material that shows small change in potential during deposition and release of lithium ions such as graphite is used in the negative electrode, capacity and withstanding voltage of the resultant capacitor hardly change when the amount of lithium ions to be deposited is changed. Therefore, it is sufficient for achieving the effect of the present invention, to deposit the amount that corresponds to the irreversibility during the initial charge, namely about 50 mAh/g, although it depends on the kind of graphite.

When an active material that has amorphous structure such that the potential shows a gradual decrease during deposition of lithium ions and an increase in potential during release of lithium ions such as PAS is used in the negative electrode, increasing the amount of lithium ions deposited leads to a decrease in potential and therefore an increase in the withstanding voltage (charging voltage) of the resultant capacitor and a decrease in the rate of voltage increase during discharge (inclination of discharge curve), thus resulting in a slightly higher capacity. Therefore, it is desirable to adjust the amount of lithium ions within the lithium ion absorbing capacity of the active material, in accordance to the operating voltage of the capacitor.

Aprotic organic solvent is used as the solvent that constitutes the electrolytic solution of the organic electrolytic capacitor of the present invention. The aprotic organic solvent may be ethylene carbonate, propylene carbonate, dimethyl carbonate, diethyl carbonate, γ-butyrolactone, acetonitrile, dimethoxyethane, tetrahydrofuran, dioxolane, methylene chloride, sulfolane, or the like. Moreover, a solution prepared by mixing two or more kinds of these aprotic organic solvents may be used, but the materials must be properly selected since the solution may be decomposed depending on the kinds of the positive electrode and the negative electrode, and the range of charge and discharge voltages that are employed.

The electrolyte to be dissolved in the single or mixed solvent described above may be any electrolyte that can generate lithium ions, such as LiI, LiClO$_4$, LiAsF$_6$, LiBF$_4$, LiPF$_6$ or the like.

While the electrolyte and the solvent are mixed after being sufficiently dewatered so as to prepare the electrolytic solution, a concentration of the electrolyte in the electrolytic solution is preferably 0.1 moles/l or higher in order to keep the internal resistance due to the electrolytic solution at a low level, and more preferably in a range from 0.5 to 1.5 moles/l.

The solvent of the electrolytic solution is preferably a mixture of ethylene carbonate, diethyl carbonate and propylene carbonate in order to improve the characteristic, while it is more preferable that proportion of propylene carbonate is 25% by weight or less and the ratio of ethylene carbonate to diethyl carbonate is in a range from 70/30 to 30/70, in order to ensure reliability over a long period of time.

The separator generally comprises a micro-porous film made of polypropylene or polyethylene measuring 25 μm having a porosity of 30%. This is because the porosity cannot be made higher in a lithium ion-based battery lest a needle crystal called dendrite would grow on the surface of the negative electrode during charging, with the crystal eventually penetrating the separator to cause short circuiting.

In case the object of the organic electrolytic capacitor of the present invention is simply to achieve a high capacity, it can be achieved with the aforementioned microporous film used in lithium ion secondary batteries. In order to achieve high output characteristic, however, it is desirable for two reasons described below, that the thickness of the separator is not less than 4% and not higher than 15% of the total thickness of the positive electrode and the negative electrode, and that the porosity is not less than 50% and not higher than 80%.

The first reason is that it is necessary to keep the positive electrode and the negative electrode at a small distance from each other and increase the opposing surface area, in order to decrease the internal resistance. The organic electrolytic capacitor of the present invention has lithium deposited on the negative electrode during charging similarly to the lithium ion secondary battery that employs graphite in the negative electrode, it has lower capacity and shorter charging time than the secondary battery which makes dendrite less likely to be generated. As a result, the separator having high porosity can be used. While it is desirable to set the porosity higher in view of increasing the output, the porosity is preferably in a range from 50 to 80% in order to avoid short circuiting during assembly of the cell. The porosity of the separator is defined as {1–(weight of separator/density of separator material)/apparent volume of separator} given in percentage. In the case of a separator made of cellulose-based material having size of 10 mm×10 mm×50 μm and weight of 0.27 g, for example, since cellulose has density of 1.2 g/ml and apparent volume is 0.5 ml, a porosity of 55% is determined by substituting these values in the formula described above, as {1–(0.27/1.2)/0.5}=0.55.

The second reason is that the separator must hold much electrolytic solution. In the lithium ion secondary battery, apparent movement of lithium ions from the positive electrode to the negative electrode occurs during charging, and opposite movement from the negative electrode to the positive electrode occurs when discharging. Since ion concentration in the electrolytic solution does not change, output characteristic is not affected even when the separator holds only a small quantity of electrolytic solution. In the organic electrolytic capacitor of the present invention, however, anions are stored in the positive electrode and lithium ions are stored in the negative electrode during charging and, as a result, ion concentration in the electrolytic solution decreases and the internal resistance may increase. Therefore, much electrolytic solution is required in order to achieve high output characteristic.

Increasing the thickness of the separator so as to hold much electrolytic solution leads to larger distance between the electrodes and higher internal resistance, while in addition the quantity of active material per unit volume decreases and the capacity decreases. However, much electrolytic solution can be held without decreasing the capacity, by making the separator thinner and increasing the porosity.

In case PAS is used in the negative electrode of the organic electrolytic capacitor according to the invention, cycle characteristic and output characteristic are improved. Since PAS has amorphous structure, deposition and release of lithium ions does not cause structural change such as swelling and shrinkage, thus resulting in excellent cycle characteristic. Also because PAS has a molecular structure (higher order structure) that makes isotropic response to deposition and release of lithium ions, it shows excellent characteristic during quick charge and quick discharge and is preferably used as the negative electrode material.

Unlike secondary batteries of which capacity is determined by the storage capacity of lithium in the positive electrode and the negative electrode and the total quantity of lithium ions in the cell, the capacitor of the present invention has characteristic that is determined by the kind of the positive electrode and the negative electrode, quantity of lithium ions deposited thereon and potential balance between the electrodes, and

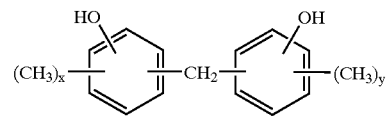

therefore allows wider variations in design than the secondary batteries.

The aromatic condensation polymer refers to a condensate of an aromatic hydrocarbon compound and aldehydes. As the aromatic hydrocarbon compound, for example, so-called phenols such as phenol, cresol, xylenol and the like can be preferably used. For example, the phenols may be methylenebisphenols represented by the following chemical formulas: wherein x and y each independently represents 0, 1 or 2, or hydroxybiphenyls or hydroxynaphthalenes. Among these, phenols are preferable in view of practical use, and phenol is particularly preferable.

As the aromatic condensation polymer, there can be used a modified aromatic condensation polymer wherein a portion of the aromatic hydrocarbon compound having a phenolic hydroxyl group with an aromatic hydrocarbon compound having no phenolic hydroxyl group, such as, xylene, toluene, aniline or the like, for example, condensate of phenol, xylene and formaldehyde. Furthermore, a modified aromatic polymer substituted with melamine, urea or the like can be used and a furan resin is also preferable.

As the aldehyde, aldehydes such as formaldehyde, acetaldehyde, furfural and the like can be used. Among these aldehydes, formaldehyde is preferable. The phenol formaldehyde condensate may be a novolak or resol type formaldehyde condensate, or a mixture thereof.

The insoluble and infusible substrate is obtained by applying a heat treatment to the aromatic condensation polymer, and all insoluble and infusible substrates having a polyacene skeletal structure that are described in Japanese Unexamined Patent Publication (Kokai) No. 1-44212 and Japanese Unexamined Patent Publication (Kokai) No. 3-24024 can be used.

The insoluble and infusible substrate used in the present invention may also be manufactured as follows. The aromatic condensation polymer is heated gradually to an appropriate temperature in a range from 400 to 800° C. in a non-oxidizing atmosphere (including vacuum) to obtain an insoluble and infusible substrate in which a ratio of hydrogen atoms to carbon atoms (hereinafter referred to as H/C) is in a range from 0.5 to 0.05, preferably from 0.35 to 0.10.

An insoluble and infusible substrate having a specific surface area of 600 $m^2/g$ as determined by a BET method may also be obtained by the method disclosed in Japanese Unexamined Patent Publication (Kokai) No. 3-24024. For example, a solution containing an initial condensate of an aromatic condensation polymer and an inorganic salt such as zinc chloride is prepared, and the solution is heated and cured in a mold.

The cured material is heated gradually to a temperature from 350 to 800° C. or preferably from 400 to 750° C. in a non-oxidizing atmosphere (including vacuum). By washing the material carefully with water or dilute hydrochloric acid, an insoluble and infusible substrate having H/C of the value described above and a specific surface area of 600 $m^2/g$ as determined by a BET method is obtained.

The insoluble and infusible substrate used in the present invention shows a main peak at a position where 2θ is 24° or less in X-ray diffraction (CuKα) and, besides the main peak, other broad peaks in a region from 41 to 46°. The insoluble and infusible substrate made as described above is therefore considered to have a polyacene skeletal structure wherein aromatic polycyclic structure has properly developed and has amorphous structure, that allows stable doping with lithium ions, and is therefore useful as the active material for batteries.

The negative electrode of the organic electrolytic capacitor according to the present invention preferably comprises the negative electrode active material such as PAS, and the negative electrode active material in such a form that is easily molded including powder, particles or short fibers is molded using a binder. As the binder, for example, there can be used rubber-based binders such as SBR; fluorine-containing resins such as polyethylene tetrafluoride and polyvinylidene fluoride; and thermoplastic resins such as polypropylene and polyethylene. Among these binders, a fluorine-containing binder can be preferably used. A fluorine-containing binder having an atomic ratio of fluorine atom to carbon atom (hereinafter referred to as F/C) of less than 1.5 and not less than 0.75 is preferably used and a fluorine-containing binder having F/C of less than 1.3 and not less than 0.75 is more preferably used.

Examples of the fluorine-containing binder include polyvinylidene fluoride, vinylidene fluoride-ethylene trifluoride copolymer, ethylene-ethylene tetrafluoride copolymer and propylene-ethylene tetrafluoride copolymer. It is alsopossibletouse afluorine-containing binder in which hydrogen on a main chain is substituted with an alkyl group.

In case of vinylidene fluoride, F/C is 1. In case of the vinylidene fluoride-ethylene trifluoride copolymer, F/C is 1.25 or 1.1 when a molar fraction of vinylidene fluoride is 50% or 80%. In case of the propylene-ethylene tetrafluoride copolymer, F/C is 0.75 when a molar fraction of propylene is 50%. Among these, avinylidene fluoride-ethylene trifluoride copolymer wherein a molar fraction of polyvinylidene fluoride and vinylidene fluoride is 50% is preferably used, and vinylidene fluoride is more preferably used from a practical point of view.

When such a binder is used, capacity of PAS to hold lithium can be fully utilized.

The negative electrode of the organic electrolytic capacitor according to the present invention may include an electrically conductive material such as acetylene black, graphite or metal powder added to the negative electrode active material as required.

The positive electrode of the organic electrolytic capacitor according to the present invention is made by adding an electrically conductive material, a binder and/or other agent to the aforementioned positive electrode active material and molding the mixture. Materials and compositions of the electrically conductive material and the binder can be selected as required.

As the electrically conductive material, carbon-based materials may be preferably used such as active carbon, carbon black, acetylene black and graphite. Proper proportion of the electrically conductive material is in a range from 2 to 40% of the active material depending on the electrical conductivity of the active material, electrode shape and other factor.

The binder may be a material that is insoluble to the electrolytic solution, which will be described later, that is used in the organic electrolytic capacitor of the present invention. For example, there can be preferably used rubber-based binders such as SBR; fluorine-containing resins such as polytetrafluoroethylene and polyvinylidene fluoride; and thermoplastic resins such as polypropylene or polyethylene. The proportion of the binder is preferably not higher than 20% of the active material.

The positive electrode collector and the negative electrode collector of the organic electrolytic capacitor according to the present invention preferably have holes that penetrate the thickness thereof, such as expanded metal, punched metal, mesh or foam. There are no limitations to the form and number of the through holes, which may be selected so that lithium ions in the electrolytic solution can move between the front and back surfaces of the electrodes without being blocked by the electrode collectors.

The porosity of the electrode collectors is defined as {1−(weight of electrode collector/true specific gravity of electrode collector)/(apparent volume of electrode collector)} given in percentage. While the porosity is desirable to be higher as it causes a shorter time required to keep lithium ions held on the negative electrode and makes unevenness unlikely to occur. But it is difficult to keep the active material held on the openings, and low strength of the electrode results in lower yield of manufacturing the electrode. Moreover, the active material located on the openings, particularly at the edge, easily drop off thus making a cause of internal short circuiting of the battery.

When the porosity is low, on the other hand, it takes a long time to deposit lithium ions on the negative electrode, although the electrode has a higher strength and the active material becomes less likely to drop off and therefore higher yield of manufacturing the electrode is achieved. Thus it is desired to determine the porosity and hole diameter of the collector by taking the battery structure (such as stack type or wound type) and productivity into consideration.

The electrode collector can be made of various materials that have been commonly proposed for lithium-based batteries. Aluminum, stainless steel or the like may be used for the positive electrode, and stainless steel, copper, nickel or the like may used for the negative electrode.

In the organic electrolytic capacitor according to claim 3 of the present invention, metal lithium deposited through electrochemical contact with the metal lithium disposed in the cell refers to an active material that contains at least metal lithium and is capable of supplying lithium ions, such as metal lithium or lithium-aluminum alloy.

Figure 1:
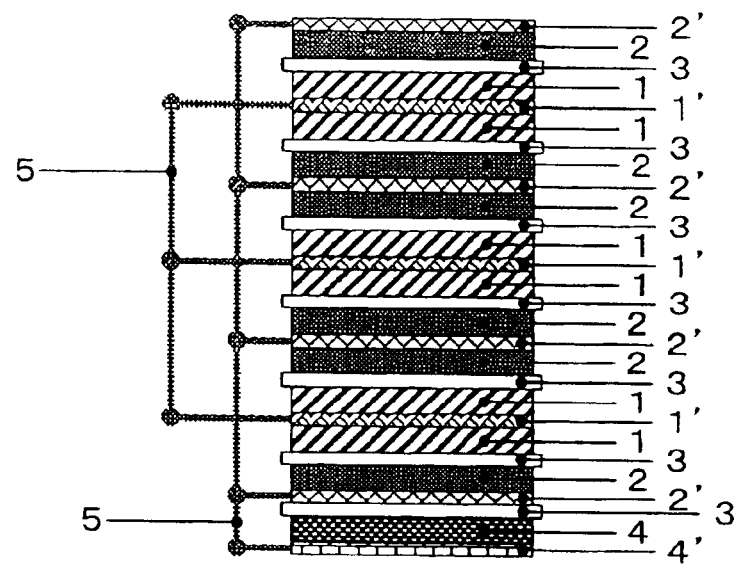
FIG. 1 is an explanatory drawing showing a first example of electrode arrangement in a cell according to the present invention.

Reference numeral 1 denotes a positive electrode, 2 denotes a negative electrode, 1' denotes a charge collector (positive electrode), 2' denotes a charge collector (negative electrode), 1" denotes a positive electrode terminal, 2" denotes a negative electrode terminal, 3 denotes a separator, 4 denotes metal lithium, 4' denotes a charge collector (metal lithium), 4" denotes a lithium terminal, 5 denotes a lead wire, 5' denotes a lead wire, 6 denotes a roll and 7 denotes a tape used to secure the roll.

BEST MODE FOR CARRYING OUT THE INVENTION

The present invention will be described in more detail below with reference to the accompanying drawings. FIGS. 1 to 6 show various embodiments of the organic electrolytic capacitor according to the present invention comprising a plurality of sets of positive electrode plate, separator and negative electrode plate are stacked one on another in a cell wherein lithium is disposed.

FIG. 1 shows an example of electrode arrangement in a casing of the capacitor having the above-mentioned constitution. As illustrated in the drawings, the negative electrode (2) formed on both surfaces of the negative electrode collector (2') and the metal lithium (4) which is pressure-bonded onto the metal lithium collector (4') such as stainless steel mesh, expanded metal made of copper or the like are connected with each other by means of a lead wire (5), while the metal lithium (4) is disposed at a lower position of the stacked unit.

The negative electrode collector (2') and the metal lithium collector (4) may also be welded directly to each other. The positive electrode (1) formed on both surfaces of the positive electrode collector (1') and the negative electrode (2) are stacked one on another via the separator (3).

The separator (3) is made of a porous material that is durable against the electrolytic solution or the electrode active material, has vent holes penetrating therethrough and is not electrically conductive, made of cloth, unwoven fabric or porous material made of such a material as glass fiber, polyethylene or polypropylene. While the thickness of the separator (3) is preferably thinner in order to decrease the internal resistance of the capacitor, the thickness may be determined by taking the quantity, fluidity and strength of the electrolytic solution into consideration.

The separator (3) is impregnated with the electrolytic solution, and the electrolytic solution consists of a compound, capable of producing ions which can be deposited on the positive electrode and the negative electrode, dissolved in an aprotic organic solvent. The electrolytic solution is typically in liquid phase and is included in the separator (3), but may also be used in the form of gel or a solid so as to prevent leakage in such a case as the separator (3) is not used. The negative electrode collector (2') and the positive electrode collector (1') have holes (not shown) that penetrate the thickness thereof, and are connected with negative electrode terminal and positive electrode terminal, respectively, of the cell.

Figure 2:
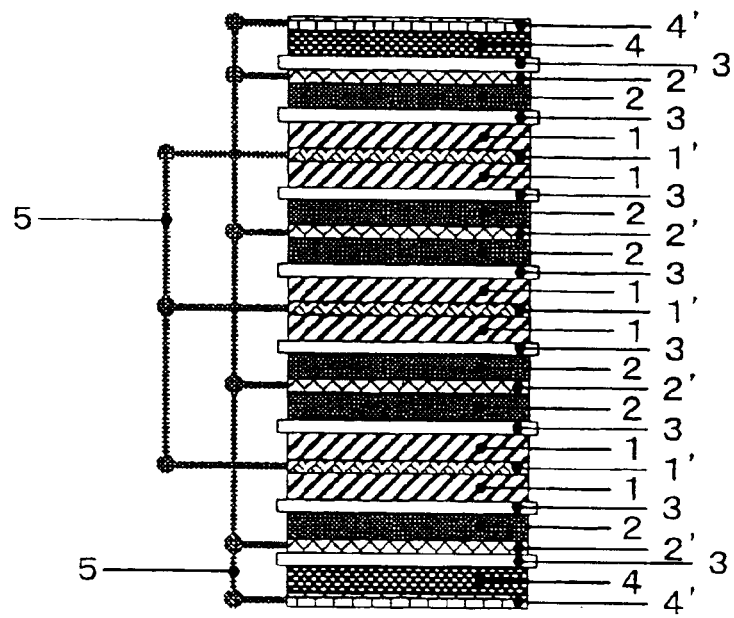
FIG. 2 is an explanatory drawing showing a second example of electrode arrangement in a cell according to the present invention.

FIG. 2 shows another example of electrode arrangement in a casing of the capacitor. In this capacitor, the metal lithium (4) which is pressure-bonded onto the metal lithium collector (4') is disposed at an upper position and lower position of the stacked unit.

Figure 3:
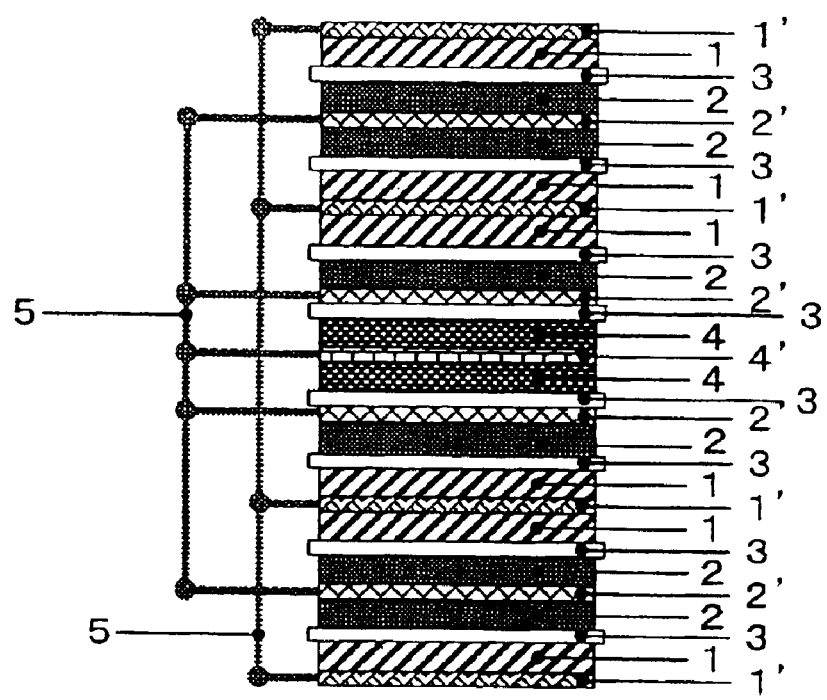
FIG. 3 is an explanatory drawing showing a third example of electrode arrangement in a cell according to the present invention.

In the other example shown in FIG. 3, the metal lithium (4) is disposed in the middle of the stacked unit. In such an electrode arrangement of stacked construction, position of the metal lithium (4) can be changed as required as described above.

Figure 4:
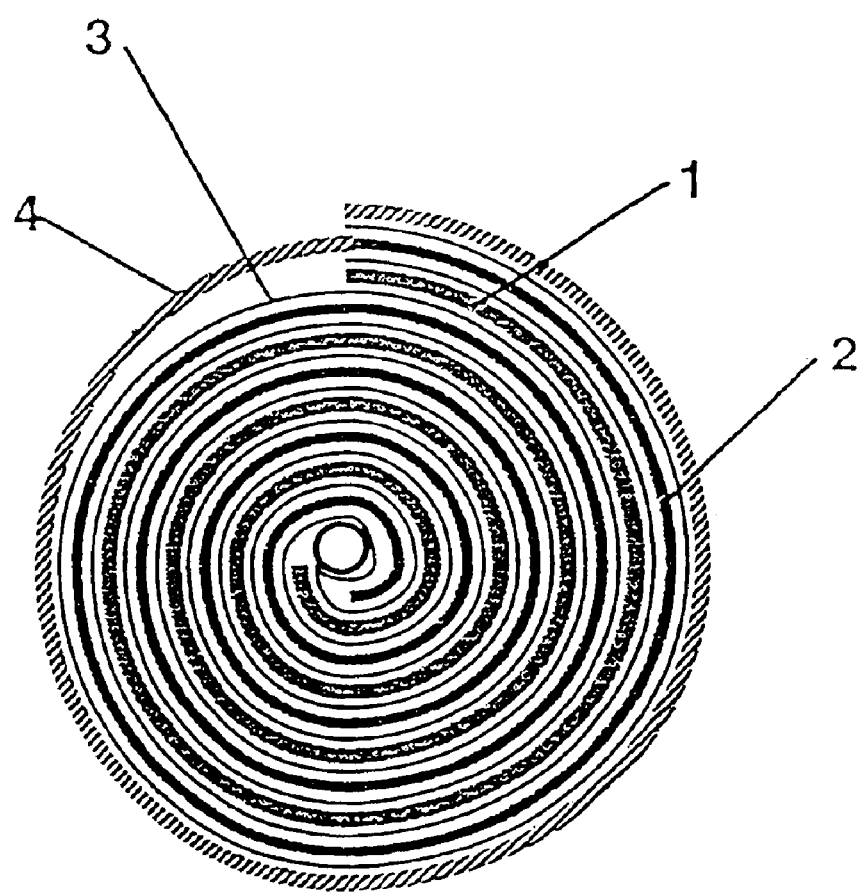
FIG. 4 is an explanatory drawing showing a fourth example of electrode arrangement in a cell according to the present invention.
Figure 5:
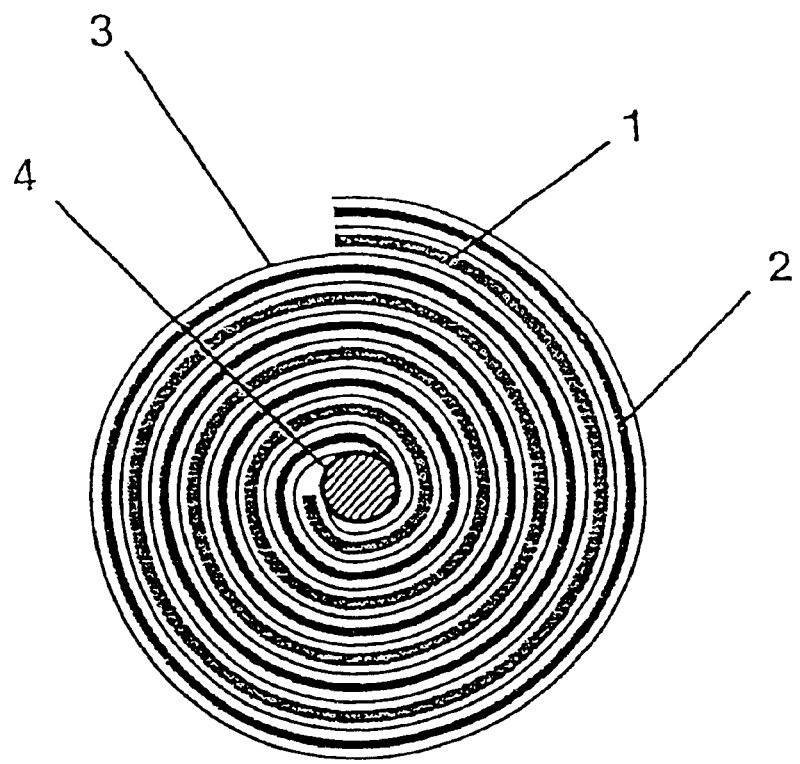
FIG. 5 is an explanatory drawing showing a fifth example of electrode arrangement in a cell according to the present invention.

FIGS. 4 and 5 show examples of electrode arrangement of capacitor having wound structure used in cylindrical capacitor, in embodiments of the present invention. In these electrode arrangements, the positive electrode (1) and the negative electrode (2) are formed on the collectors (the collectors are not shown in the drawings).

FIG. 4 shows an example in which the metal lithium (4) is pasted onto the negative electrode collector (2') in the outermost layer (only the metal lithium (4) is shown in the portion where it is pasted in the drawing). FIG. 5 shows an example in which the cylindrical metal lithium (4) is disposed at the center of wound structure.

Figure 6:
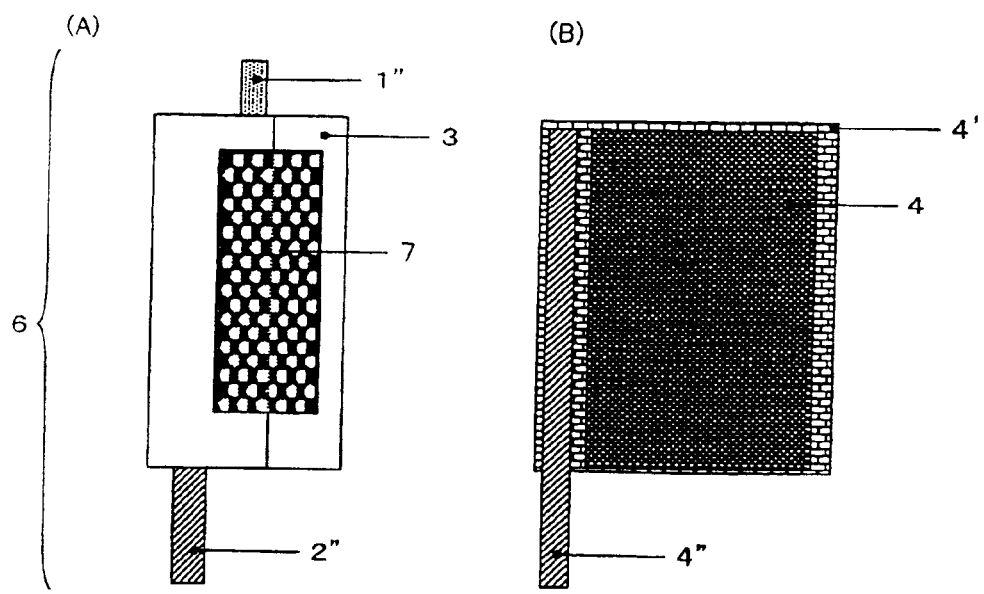
FIG. 6 is an explanatory drawing showing an example (A) of a tape used to secure the roll of the positive electrode, the negative electrode and separator and (B) an example of metal lithium disposed therein, where (A) shows the wound capacitor of the present invention fastened by the porous tape, and (B) shows the components prior to winding.

FIG. 6 shows an example of embodiment in which an adhesive tape made of propylene (7) having a porosity of 40% is wound around the circumference of the roll (6) which comprises the positive electrode (indicated by the positive electrode terminal (1") made of aluminum) and the negative electrode (indicated by the negative electrode terminal (2") made of nickel) that are wound via the separator (3). The porosity of the tape must be determined by giving consideration to the rate of depositing lithium and the strength required for taping.

In these examples, the negative electrode and lithium are brought into contact with each other via an electrically conductive material such as nickel, copper, stainless steel or the like, or by attaching lithium onto the negative electrode collector. However, the organic electrolytic capacitor of the present invention is not limited to this constitution, and lithium may be brought into contact with the negative electrode collector by directly attaching it thereto or, in case the outer casing serves as the negative electrode, metal lithium may be attached directly to the casing (made of a material other than aluminum). What is necessary here is that all the negative electrode and metal lithium make electrochemical contact and lithium ions are held by the negative electrode active material via the electrolytic solution, when the electrolytic solution is poured during assembly of the cell.

In case an electrically conductive porous material such as stainless steel mesh is used as the metal lithium collector, and 80% or more of metal lithium is deposited in the pores of the electrically conductive porous material, clearance between the electrodes decreases due to the disappearance of metal lithium even when lithium ions are deposited, so that lithium ions are smoothly deposited on the negative electrode active material.

Although such a constitution may be employed as metal lithium is disposed in the direction of the section of the negative electrode plate, and the negative electrode and metal lithium are brought into electrochemical contact with each other so that lithium ions are deposited on the negative electrode active material, unevenness in doping in the electrode becomes significant when the electrode has a large width and therefore position of the metal lithium must be selected by giving consideration to the cell construction, electrode size and other factors.

In the organic electrolytic capacitor according to the present invention, it is made possible to increase the degree of freedom in the cell design, improve the suitability to mass production and achieve excellent charge and discharge characteristic by attaching the metal lithium that is deposited on the negative electrode locally at a particular position.

Quantity of lithium ions deposited on the negative electrode of the organic electrolytic capacitor can be determined in accordance to the negative electrode material to be used and the desired characteristic of the organic electrolytic capacitor.

There is no limitation to the cell configuration of the organic electrolytic capacitor according to the present invention, which may be cylindrical, square, film or other shape.

Industrial Applicability

The organic electrolytic capacitor of the present invention has capacitance 1.3 times or more as high as that of the capacitor of the conventional constitution that uses substantially the same quantities of active material (mainly active carbon) in the positive electrode and the negative electrode, and is a capacitor that is very safe and can be easily manufactured. The organic electrolytic capacitor can be used in applications that require high capacity such as the main power source for electric iron, electric tooth brush, shaver, headphone stereo, portable radio, digital camera and electric vehicle.

EXAMPLES

Examples 1 to 6 and Comparative Examples 1 to 4
(Method of Manufacturing Negative Electrode)

A sheet of phenol resin 0.5 mm thick was put into an electric furnace and heated to 500° C. at a rate of 50° C./hour in nitrogen atmosphere, then heated to 650° C. at a rate of 10° C./hour for heat treatment thereby synthesizing PAS. The PAS sheet thus made was crushed in a disk mill so as to obtain PAS powder. The PAS powder showed a H/C ratio of 0.22.

Then 100 parts by weight of the PAS powder and a solution prepared by dissolving 10 parts by weight of polyvinylidene fluoride in 120 parts by weight of N-methyl pyrrolidone were well mixed to obtain a slurry. The slurry was applied to one surface of a copper foil 18 $\mu$m thick so as to deposit about 7 mg/cm$^2$ of solid, and was dried and pressed thereby to obtain the PAS-based negative electrode.

(Method of Manufacturing Positive Electrode 1)

A water-soluble resol (about 60% in concentration), zinc chloride and water were mixed in weight proportions of 10:25:4 to obtain a solution. The solution was poured into a mold measuring 100 mm×100 mm×2 mm and a glass plate was put thereon to prevent the water from evaporating, and the solution was cured by heating to about 100° C. for one hour.

The phenol resin was put into an electric furnace and heated to 600° C. at a rate of 40° C./hour in flowing nitrogen gas to carry out heat treatment. The heat-treated material was washed in dilute hydrochloric acid followed by washing in water, and was dried to obtain a PAS sheet. The PAS sheet thus made was crushed in a nylon ball mill so as to obtain PAS powder. The PAS powder showed specific surface area of 1900 m$^2$/g as measured by a BET method and a H/C ratio of 0.21 as measured by element analysis.

100 parts by weight of the PAS powder and a solution prepared by dissolving 10 parts by weight of polyvinylidene fluoride powder in 100 parts by weight of N-methyl pyrrolidone were well mixed to obtain a slurry. The slurry was applied to one surface of an aluminum foil 20 $\mu$m in thickness that was coated with a carbon-based electrically conductive coating material so as to deposit about 7 mg/cm$^2$ of solid, and was dried and pressed thereby to obtain the positive electrode 1.

(Method of Manufacturing Positive Electrode 2)

A sheet of phenol resin 0.5 mm thick was put into an electric furnace and heated to 500° C. at a rate of 50° C./hour in nitrogen atmosphere, then heated to 650° C. at a rate of 10° C./hour to carry out a heat treatment thereby synthesizing PAS. The PAS sheet thus made was activated with steam and was then crushed in a nylon ball mill so as to obtain PAS powder. The PAS powder showed specific surface area of 1500 m$^2$/g as measured by a BET method and a H/C ratio of 0.10 as measured by element analysis.

Then 100 parts by weight of the PAS powder and a solution prepared by dissolving 10 parts by weight of polyvinylidene fluoride powder in 100 parts by weight of N-methyl pyrrolidone were well mixed to obtain a slurry. The slurry was applied to one surface of an aluminum foil 20 $\mu$m in thickness that was coated with a carbon-based electrically conductive coating material so as to deposit about 7 mg/cm$^2$ of solid, and was dried and pressed thereby to obtain the positive electrode 2.

(Method of Manufacturing Positive Electrode 3)

100 parts by weight of commercially available active carbon powder having specific surface area of 2000 m$^2$/g and a solution prepared by dissolving 10 parts by weight of polyvinylidene fluoride powder in 100 parts by weight of N-methyl pyrrolidone were well mixed to obtain a slurry. The slurry was applied to one surface of an aluminum foil 20 $\mu$m in thickness so as to deposit about 7 mg/cm$^2$ of solid, and was dried and pressed thereby to obtain the positive electrode 3.

(Method of Manufacturing Positive Electrode 4)

100 parts by weight of active carbon powder having specific surface area of 2000 m$^2$/g, that was alkali-activated with KOH that is commercially available and a solution prepared by dissolving 10 parts by weight of polyvinylidene fluoride powder in 100 parts by weight of N-methyl pyrrolidone were well mixed to obtain a slurry. The slurry was applied to one surface of an aluminum foil 20 $\mu$m in thickness coated with a carbon-based electrically conductive coating material so as to deposit about 7 mg/cm² of solid, and was dried and pressed thereby to obtain the positive electrode 4.

(Measurement of Capacitance Per Unit Weight of Capacitor Having Conventional Constitution)

The positive electrodes 1 to 4 were each cut into three sheets measuring 1.5×2.0 cm², one sheet being used as positive electrode, one sheet as negative electrode and reference electrode. A separator made of unwoven paper fabric 50 μm thick was interposed as the separator between the positive electrode and the negative electrode to build a mock cell of capacitor. A solution prepared by dissolving triethyl methyl ammonium-tetrafluoroborate (TEMA.BF4) in propylene carbonate in a concentration of 1 mole/l was used as the electrolytic solution.

The capacitor was charged to 2.5 V with charge current of 10 mA, followed by charging with constant voltage for a total charging time of one hour. Then the capacitor was discharged with 1 mA to 0 V. Capacitance per unit weight of the cell was determined from the time taken to discharge from 2.0 V to 1.5 V. Capacitance per unit weight of the positive electrode was determined from the potential difference between the reference electrode and the positive electrode. The results are shown in Table 1.

TABLE 1

|  | Positive electrode 1 | Positive electrode 2 | Positive electrode 3 | Positive electrode 4 |
| --- | --- | --- | --- | --- |
| Capacitance per unit weight of the cell (F/g) | 34 | 21 | 14 | 39 |
| Capacitance per unit weight of the positive electrode (F/g) | 143 | 85 | 62 | 158 |

(Measurement of Capacitance Per Unit Weight of the Negative Electrode)

The negative electrode was cut into four sheets measuring 1.5×2.0 cm² used as negative electrodes for evaluation. The negative electrode and metal lithium sheet measuring 1.5×2.0 cm² and 200 μm thick used as the opposing electrode were assembled with a separator made of unwoven polyethylene fabric 50 μm thick interposed there between, to build a mock cell. Metal lithium was used as the reference electrode. A solution prepared by dissolving $LiPF_6$ in propylene carbonate in a concentration of 1 mole/l was used as the electrolytic solution.

The negative electrodes were deposited with lithium of 280 mAh/g, 350 mAh/g, 400 mAh/g and 500 mAh/g per unit weight of the negative electrode active material with charging current of 1 mA, and the cells were discharged with 1 mA down to 1.5 V. Capacitance per unit weight of the negative electrode was determined from the time taken for the potential of the negative electrode to decrease from the potential at the time one minute after the start of discharge down to 0.2 V. The results are shown in Table 2.

TABLE 2

| Charge level (mAh/g) | 280 | 350 | 400 | 500 |
| --- | --- | --- | --- | --- |
| Capacitance per unit weight of the negative electrode (F/g) | 302 | 455 | 653 | 748 |

The charge level is the accumulated charge current supplied to the negative electrode divided by the weight of the negative electrode active material, given in mAh/g.

(Measurement of Capacitance Per Unit Weight of Cell of the Present Invention)

Positive electrodes and negative electrodes having different weights of active material were made by changing the quantity of coating material per unit area on the positive electrode and the negative electrode thereby changing the electrode thickness. Weights of the active material provided on the electrodes thus made measuring 1.5×2.0 cm² are shown in Tables 3 to 7.

TABLE 3

|  | Positive electrode 1 | | | |
| --- | --- | --- | --- | --- |
|  | Positive electrode 1-1 | Positive electrode 1-2 | Positive electrode 1-3 | Positive electrode 1-4 |
| Weight of active material (g) | 0.014 | 0.018 | 0.022 | 0.026 |

TABLE 4

|  | Positive electrode 2 | |
| --- | --- | --- |
|  | Positive electrode 2-1 | Positive electrode 2-2 |
| Weight of active material (g) | 0.014 | 0.032 |

TABLE 5

|  | Positive electrode 3 Positive electrode 3-1 |
| --- | --- |
| Weight of active material (g) | 0.028 |

TABLE 6

|  | Positive electrode 4 Positive electrode 4-1 |
| --- | --- |
| Weight of active material (g) | 0.028 |

TABLE 7

|  | Negative electrode | | | | | |
| --- | --- | --- | --- | --- | --- | --- |
|  | Negative electrode 1 | Negative electrode 2 | Negative electrode 3 | Negative electrode 4 | Negative electrode 5 | Negative electrode 6 |
| Weight of active material (g) | 0.008 | 0.012 | 0.014 | 0.018 | 0.022 | 0.026 |

The eight kinds of positive electrode and six kinds of negative electrode shown in the above table were combined with separator made of unwoven polyethylene fabric 50 μm thick interposed therebetween, to build mock cells. A solution prepared by dissolving LiPF6 in propylene carbonate in a concentration of 1 mole/l was used as the electrolytic solution.

The negative electrodes that were used here had been charged with a predetermined quantity of lithium by electrochemical method in advance using the same cell as used in capacitance per unit weight of the negative electrode.

The capacitors were charged to 3.3 V with 10 mA, followed by charging with constant voltage for a total charging time of one hour. Then the capacitors were discharged with 1 mA to 2 V. Capacitance per unit weight of the cell was determined from the time taken to discharge from 3.0 V to 2.5 V. Combinations of the positive electrode and the negative electrode, capacitance per unit weight of the positive electrode and of the negative electrode, capacitance per unit weight of the cell and their ratios to the capacitance per unit weight of the cell obtained from capacitor of the conventional constitution with the positive electrode in use are shown in Table 8.

were deposited on the negative electrode by shorting the negative electrode and the metal lithium in the cell.

(Method of Manufacturing the Negative Electrode)

A slurry similar to that of the negative electrode of the aforementioned example was applied to both surfaces of an expanded metal made of copper 40 μm thick (porosity 50%), and was pressed thereby to obtain PAS negative electrode 200 μm in thickness.

(Method of Manufacturing the Positive Electrode)

A slurry similar to that of the positive electrode 2 of the aforementioned example was applied to both surfaces of an expanded metal made of aluminum 40 μm thick (porosity 50%) that was coated with a carbon-based electrically conductive coating material, and was pressed thereby to obtain PAS positive electrode 380 μm in thickness.

(Fabrication of Cell)

Seven cylindrical capacitors were made by using the PAS positive electrode (5.4×29.0 cm$^2$), the PAS negative electrode (5.6×31.0 cm$^2$) and a separator made of polyethylene 25 μm thick. The weight of the positive electrode active material was 1.6 times the weight of the negative electrode active material. Negative electrode collector having metal lithium foil (200 μm, 5.6×4.9 cm$^2$) pressure-bonded thereto

TABLE 8

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Positive electrode No. | 1-4 | 1-4 | 1-3 | 2-2 | 4-1 | 3-1 | 2-1 | 4-1 | 1-1 | 1-2 |
| C+ | 143 | 143 | 143 | 85 | 158 | 62 | 85 | 158 | 143 | 143 |
| W+ | 0.026 | 0.026 | 0.022 | 0.032 | 0.028 | 0.028 | 0.014 | 0.028 | 0.014 | 0.018 |
| Negative electrode No. | 3 | 3 | 4 | 1 | 2 | 2 | 6 | 2 | 6 | 5 |
| C− | 748 | 455 | 653 | 653 | 653 | 748 | 653 | 302 | 653 | 302 |
| W− | 0.014 | 0.014 | 0.018 | 0.004 | 0.012 | 0.012 | 0.026 | 0.012 | 0.026 | 0.022 |
| C−/C+ | 5.23 | 3.18 | 4.57 | 7.68 | 4.13 | 12.1 | 7.68 | 1.91 | 4.57 | 2.11 |
| W+/W− | 1.86 | 1.86 | 1.22 | 4.00 | 2.33 | 2.33 | 0.54 | 2.33 | 0.54 | 0.82 |
| C | 60.9 | 54.2 | 54.9 | 39.2 | 63.0 | 33.2 | 23.5 | 46.1 | 37.7 | 41.0 |
| C/C' | 1.79 | 1.59 | 1.61 | 1.87 | 1.62 | 2.37 | 1.12 | 1.18 | 1.11 | 1.21 |

C+: Capacitance per unit weight of the positive electrode active material (F/g)
W+: Weight of active material on positive electrode (g)
C−: Capacitance per unit weight of the negative electrode active material (F/g)
W−: Weight of active material on negative electrode (g)
C−/C+: Ratio of capacitance per unit weight of the negative electrode active material to capacitance per unit weight of the positive electrode active material
W+/W−: Weight ratio of positive electrode active material to negative electrode active material
C: Capacitance per unit weight of the cell (F/g)
C/C': Ratio of capacitance per unit weight of the cell to capacitance per unit weight of the cell of EDLC of conventional design As shown in Table 8, the cells of the present invention showed higher capacitance per unit weight of the cell compared to the capacitors of the conventional constitution.

Example 7

(Method of Depositing Lithium Ions on Negative Electrode)

Lithium ions were deposited on the negative electrode by shorting the negative electrode and the metal lithium in the cell. On assumption that all metal atoms charged in the cell are ionized, the amount of lithium ions deposited on the negative electrode is given by the following equation, where the weight of the negative electrode active material is denoted as W− (g), a surface area of metal lithium as $S_{Li}$ (cm$^2$), and a thickness as $T_{Li}$ (cm), substituting the atomic weight 6.941 of lithium and a specific density of 0.534 g/cm$^3$.

Amount deposited (mAh/g)=($S_{Li}$×$T_{Li}$×0.534)/6.941×96500/3.6/W−

Throughout this specification, required quantity of metal lithium was determined with this equation when lithium ions was used to make the cylindrical capacitor by disposing the positive electrode and the negative electrode to oppose each other and winding them as shown in FIG. 4. A solution prepared by dissolving LiPF$_6$ in propylene carbonate in a concentration of 1 mole/l was used as the electrolytic solution. After being left to stand at the room temperature for seven days, one of the capacitors was disassembled and showed complete disappearance of the metal lithium, and it was considered that such an amount of lithium as required to achieve an capacitance of 650 F/g per unit weight of the negative electrode active material was charged beforehand. The ratio of capacitance per unit weight of the negative electrode active material to that of the positive electrode active material was 7.65.

(Evaluation of Cell Characteristic)

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 9. Energy density and power density of this capacitor were 15 Wh/l and 600 W/l, respectively.

The above cycle was further repeated 100 times, and the cell capacity was determined to be 90 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 10. Energy density and power density of this capacitor were 16 Wh/l and 700 W/l, respectively.

The above cycle was further repeated 100 times, and the cell capacity was determined to be 98 mAh.

TABLE 9

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 88 | 80 | 72 | 38 |
| 2 | 88 | 79 | 72 | 37 |
| 3 | 89 | 80 | 73 | 38 |
| Average (n = 3) | 88 | 80 | 72 | 38 |

TABLE 10

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 98 | 88 | 80 | 43 |
| 5 | 96 | 87 | 78 | 44 |
| 6 | 96 | 87 | 79 | 42 |
| Average (n = 3) | 97 | 87 | 79 | 43 |

Comparative Example 5

A slurry similar to that of the positive electrode of Example 7 was applied to both surfaces of an aluminum foil 20 μm thick that was coated with a carbon-based electro-conductive paste, and was pressed thereby to obtain PAS positive electrode and PAS negative electrode 200 μm thick.

Six cylindrical cells were made by using the PAS positive electrode (5.4×38.0 cm$^2$), the PAS negative electrode (5.6×40.0 cm$^2$) and a separator made of nonwoven paper fabric 50 μm thick. The weight of the positive electrode active material was 0.92 times the weight of the negative electrode active material, almost equal. The ratio of capacitance of the negative electrode to that of the positive electrode was 1 since the same active material was used, having similar constitution as that of the conventional constitution. A solution prepared by dissolving TEMABF4 (triethylmethylammonium tetrafluoroborate) in propylene carbonate in a concentration of 1.5 mole/l was used as the positive electrode electrolytic solution.

Three out of the six cells were charged with constant current of 1000 mA till the cell voltage reached 2.5 V, followed by charging with constant current at constant voltage with constant voltage of 2.5 V applied for one hour. The cells were then discharged with constant current of 100 mA till the voltage decreased to 1.0 V. This cycle of charge and discharge between 2.5 V and 1.0 V was repeated, and measurement of cell capacity upon the third discharge showed 50 mAh (mean value of three cells). Energy density and power density of this capacitor were 5.3 Wh/l and 10 Wh/l or less, respectively.

The cycle was further repeated 100 times with discharge current of 100 mA, and the cell capacity was determined to be 50 mAh.

The remaining three cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 55 mAh (mean value of three cells). Energy density and power density of this capacitor were 7.2 Wh/l and 10 Wh/l, respectively.

The above cycle was further repeated 100 times with discharge current of 100 mA, and the cell capacity was determined to be 25 mAh.

In a constitution similar to that of the conventional EDLC as in Comparative Example 5, the capacity is less than that of Example 7. Although capacity does not decrease in the 2.5 V cycles, considerable decrease in capacity occurred in the 3.3 V cycles.

Example 8

PAS negative electrode having a thickness of 200 μm similar to that of Example 7 and PAS positive electrode having a thickness of 380 μm were cut to 5.0×7.0 cm$^2$, and seven cells were made by stacking the positive electrodes, separators and the negative electrodes (five positive electrodes) as shown in FIG. 2 by using polypropylene separators having a thickness of 25 μm. Two negative electrodes disposed on the outside were the negative electrodes described above being coated on both surfaces with one surface peeled off having a thickness of 120 μm. The weight of the positive electrode active material was 1.7 times the weight of the negative electrode active material. Metal lithium foil (80 μm, 5.0×7.0 cm$^2$) that was pressure-bonded onto a stainless steel mesh having a thickness of 80 μm was used as the metal lithium, two of which were disposed at the top and bottom of the stacked electrode unit so as to oppose the negative electrode. The negative electrodes (two single-sided electrodes and four double-sided electrodes) and the stainless steel mesh having a metal lithium foil being pressure-bonded thereto were brought into contact with each other by welding.

After being left to stand at the room temperature for seven days, one of the capacitors was disassembled and showed complete disappearance of metal lithium, and accordingly it was considered that such an amount of lithium ions as required to achieve an capacitance of 650 F/g per unit weight of the negative electrode active material was charged beforehand. The ratio of capacitance per unit weight of the negative electrode to that of the positive electrode active material was 7.65.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 11. Energy density and power density of this capacitor were 15 Wh/l and 600 W/l, respectively.

The above cycle was further repeated 100 times, and the cell capacity was determined to be 90 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 12. Energy density and power density of this capacity were 16 Wh/l and 700 W/l, respectively.

The above cycle was further repeated 100 times, and the cell capacity was determined to be 98 mAh.

TABLE 11

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 88 | 76 | 69 | 35 |
| 2 | 87 | 76 | 68 | 34 |
| 3 | 88 | 74 | 68 | 34 |
| Average (n = 3) | 88 | 75 | 68 | 34 |

TABLE 12

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 98 | 85 | 76 | 38 |
| 5 | 98 | 84 | 78 | 39 |
| 6 | 98 | 84 | 78 | 39 |
| Average (n = 3) | 98 | 84 | 77 | 39 |

Comparative Example 6

Six cells were built similarly to Example 7 except that lithium was not deposited on the negative electrode.

Three out of the remaining six batteries were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 30 mAh (mean value of three cells). Energy density of this capacitor was 4.5 Wh/l, less than 10 Wh/l.

The above cycle was further repeated 100 times with discharge current of 100 mA, and the cell capacity was determined to be 10 mAh.

Sufficient capacity could not be obtained when lithium ion was not deposited on the negative electrode. The capacitors also showed significant deterioration after cycles.

Comparative Example 7

Seven cells were built similarly to Example 7 except for using aluminum foil 20 μm thick as the positive electrode collector and copper foil 20 μm thick as the negative electrode collector (lithium occupied 7.9% of the surface area of the negative electrode). After being left at the room temperature for 20 days, one of the cells was disassembled and showed most of the metal lithium remaining.

Three out of the six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 32 mAh (mean value of three cells). Energy density of this capacitor was 4.8 Wh/l, less than 10 Wh/l.

The above cycle was further repeated 100 times with discharge current of 100 mA, and the cell capacity was determined to be 12 mAh.

Lithium ion could not be deposited on the negative electrode and sufficient capacity could not be obtained when metal foils were used for the collectors and metal lithium was disposed so as to oppose the negative electrode. The capacitors also showed significant deterioration after cycles.

Example 9

Seven cylindrical cells were built similarly to Example 7 by using the positive electrode and the negative electrode similar to those of Example 7, laminating metal lithium having a thickness of 32 μm and measuring 5.6×31.0 cm² on one surface of the negative electrode and using separator made of polyethylene having a thickness of 25 μm. Lithium occupied 50% of the surface area of the negative electrode. After being left to stand at the room temperature for seven days, one of the cells was disassembled and showed complete disappearance of metal lithium. The ratio of the weight of the active material and the ratio of capacitance of the positive electrode to the negative electrode were similar to those of Example 7.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells). Energy density was 15 Wh/l.

Although the organic electrolytic capacitor of Example 9 has a high energy density, it is very difficult to laminate the lithium foil having a thickness of 33 μm which is the lowest limit of metal lithium that can be processed in mass production process onto the front surface of the negative electrode.

Accordingly, the methods of depositing lithium shown in Examples 7 and 8 are preferable for the convenience of manufacturing because of high degree of freedom in the cell design.

Example 10

Seven cells were built similarly to Example 7 except that the positive electrode collector was used without coating with carbon-based electrically conductive coating material. After being left to stand at the room temperature for seven days, one of the cells was disassembled and showed complete disappearance of metal lithium. The ratio of the weight of the active material and the ratio of capacitance of the positive electrode to the negative electrode were similar to those of Example 7.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 85 mAh (mean value of three cells).

Then the capacity was measured by changing the discharge current as 170 mA (2C), 425 mA (5C), 850 mA (10C) and 4250 mA (50C), with the results shown in Table 13. Energy density and power density of this capacitor were 12 Wh/l and 110 W/l, respectively.

The above cycle was further repeated 100 times, and the cell capacity was determined to be 83 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 95 mAh (mean value of three cells).

Then the capacity was measured by changing the discharge current as 190 mA (2C), 475 mA (5C), 950 mA (10C) and 4750 mA (50C), with the results shown in Table 14. Energy density and power density of this capacitor were 15 Wh/l and 130 W/l, respectively.

The above cycle was further repeated 100 times, and the cell capacity was determined to be 92 mAh.

TABLE 13

Cell capacity with various discharge currents (unit: mAh)

| Sample No. | Discharge current | | | |
|---|---|---|---|---|
| | 2C (170 mA) | 5C (425 mA) | 10C (850 mA) | 50C (4250 mA) |
| 1 | 83 | 70 | 55 | 0 |
| 2 | 82 | 70 | 54 | 0 |
| 3 | 82 | 69 | 53 | 0 |
| Average (n = 3) | 82 | 70 | 54 | 0 |

TABLE 14

Cell capacity with various discharge currents (unit: mAh)

| Sample No. | Discharge current | | | |
|---|---|---|---|---|
| | 2C (190 mA) | 5C (475 mA) | 10C (950 mA) | 50C (4750 mA) |
| 4 | 92 | 82 | 66 | 0 |
| 5 | 93 | 82 | 67 | 0 |
| 6 | 93 | 81 | 65 | 0 |
| Average (n = 3) | 93 | 82 | 66 | 0 |

As in this example, a high energy density can be achieved with discharge of 2C class, without coating the positive electrode collector with carbon-based electro-conductive paste. In order to achieve high output characteristic beyond 500 W/l, it is desirable to coat the positive electrode collector with the carbon-based electro-conductive paste similarly to Examples 7 to 9.

Example 11

Aluminum foil 40 μm thick was coated with carbon-based electrically conductive coating material by gravure printing on both surfaces thereof and dried, then expanded so that the porosity becomes 50%. The positive electrode was made similarly to Example 7 except for using the expanded metal thus obtained as the positive electrode collector. Seven cells were built by using the electrodes described above. After being left to stand at the room temperature for seven days, one of the capacitors was disassembled and showed complete disappearance of metal lithium. The ratio of the weight of the active material and the ratio of capacitance of the positive electrode to the negative electrode were similar to those of Example 7.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 15. Energy density and power density of this capacitor were 15 Wh/l and 600 W/l, respectively.

The above cycle was further repeated 100 times, and the cell capacity was determined to be 89 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 16. Energy density and power density of this capacitor were 16 Wh/l and 700 W/l, respectively.

The above cycle was further repeated 100 times, and the cell capacity was determined to be 99 mAh.

TABLE 15

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 89 | 81 | 72 | 37 |
| 2 | 88 | 79 | 73 | 37 |
| 3 | 89 | 80 | 74 | 38 |
| Average (n = 3) | 89 | 80 | 73 | 37 |

TABLE 16

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 97 | 88 | 79 | 43 |
| 5 | 96 | 88 | 78 | 43 |
| 6 | 96 | 87 | 79 | 42 |
| Average (n = 3) | 96 | 88 | 79 | 43 |

The method of this example is convenient for the manufacturing process, provides a high degree of freedom and is preferably used in mass production.

Example 12

Seven cells were built similarly to Example 8 except for coating an expanded metal made of copper, used as the negative electrode collector, with carbon-based electro-conductive paste. After being left to stand at the room temperature for seven days, one of the capacitors was disassembled and showed complete disappearance of metal lithium, and it was considered that such an amount of lithium as required to achieve an capacitance of 650 F/g per unit weight of the negative electrode active material was charged beforehand. The ratio of the weight of the active material and the ratio of capacitance of the positive electrode to the negative electrode were similar to those of Example 8.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the cell voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 17. Energy density and power density of this capacitor were 15 Wh/l and 650 W/l, respectively.

The above cycle was further repeated 100 times, and the cell capacity was determined to be 90 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the cell voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 18. Energy density and power density of this capacitor were 16 Wh/l and 750 W/l, respectively.

The above cycle was further repeated 100 times, and the cell capacity was determined to be 99 mAh.

TABLE 17

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 89 | 80 | 72 | 37 |
| 2 | 89 | 80 | 72 | 38 |
| 3 | 90 | 81 | 73 | 40 |
| Average (n = 3) | 89 | 80 | 72 | 38 |

TABLE 18

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 97 | 89 | 79 | 43 |
| 5 | 98 | 89 | 80 | 42 |
| 6 | 96 | 88 | 78 | 42 |
| Average (n = 3) | 97 | 89 | 79 | 42 |

Example 13

Copper foil 30 μm thick was coated with carbon-based electro-conductive paste by gravure printing on both surfaces thereof and dried, then expanded so that the porosity of 50% was obtained. Seven cells were built similarly to Example 12 except for using the expanded metal thus obtained as the negative electrode collector. After being left to stand at the room temperature for seven days, one of the capacitors was disassembled and showed complete disappearance of metal lithium. The ratio of the weight of the active material and the ratio of capacitance of the positive electrode to the negative electrode were similar to those of Example 8.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 19. Energy density and power density of this capacitor were 15 Wh/l and 650 W/l, respectively.

The above cycle was further repeated 100 times, and the cell capacity was determined to be 90 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 20. Energy density and power density of this capacitor were 16 Wh/l and 750 W/l, respectively.

The above cycle was further repeated 100 times, and the cell capacity was determined to be 98 mAh.

TABLE 19

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 89 | 80 | 73 | 37 |
| 2 | 88 | 80 | 71 | 38 |
| 3 | 88 | 81 | 71 | 38 |
| Average (n = 3) | 88 | 80 | 72 | 38 |

TABLE 20

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 97 | 88 | 77 | 41 |
| 5 | 97 | 89 | 79 | 42 |
| 6 | 96 | 87 | 78 | 42 |
| Average (n = 3) | 97 | 88 | 78 | 42 |

Example 14

PAS positive electrode to (5.4×29.0 cm$^2$) and PAS negative electrode to (5.6×31.0 cm$^2$) were obtained similarly to Example 7. The positive electrode and the negative electrode were wound via a separator made of polyethylene having a thickness of 25 μm, and fastened by means of a tape made of polypropylene having a porosity of 40% that was wound around the circumference of the roll as shown in FIG. 6.

The tape was wound over the entire the circumference. Further as shown in FIG. 6, a stainless steel mesh provided with metal lithium foil (200 μm, 5.6×4.9 cm$^2$) pressure-bonded thereon was wound around the roll (6 in FIG. 6). Negative electrode terminal (2") and lithium terminal (4") were welded and put into the outer casing thereby building seven cylindrical capacitors similarly to Example 7. After being left to stand at the room temperature for seven days, one of the capacitors was disassembled and showed complete disappearance of metal lithium. The ratio of the weight of the active material and the ratio of electrostatic capacity of the positive electrode to the negative electrode were similar to those of Example 7.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 21. Energy density and power density of this capacitor were 15 Wh/l and 600 W/l, respectively.

The above cycle was further repeated 100 times, and the cell capacity was determined to be 89 mAh.

The remaining three cells were charged with constant current of 1000 mA to cell voltage of 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 22. Energy density and power density of this capacitor were 16 Wh/l and 700 W/l, respectively.

The above cycle was further repeated 100 times, and the cell capacity was determined to be 98 mAh.

TABLE 21

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 89 | 80 | 74 | 37 |
| 2 | 89 | 79 | 73 | 38 |
| 3 | 88 | 81 | 72 | 38 |
| Average (n = 3) | 89 | 80 | 73 | 38 |

TABLE 22

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 96 | 88 | 78 | 43 |
| 5 | 97 | 87 | 78 | 42 |
| 6 | 96 | 88 | 79 | 42 |
| Average (n = 3) | 96 | 88 | 78 | 42 |

Comparative Example 8

Seven cylindrical capacitors were built similarly to Example 12 except for using a tape made of polypropylene with 0% porosity as the fastening tape that was wound around the circumference. After being left to stand at the room temperature for seven days, one of the capacitors was disassembled and showed that most of the metal lithium remained.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 34 mAh (mean value of three cells). Energy density of this capacitor was 4.8 Wh/l, less than 10 Wh/l.

The above cycle was further repeated 100 times with discharge current of 100 mA, and the cell capacity was determined to be 13 mAh.

In case the tape having 0% porosity was used as the electrode fastening tape stuck on the front surface and lithium was deposited thereon, lithium could not be deposited on the negative electrode and sufficient capacity could not be obtained. The capacitors also showed significant deterioration after cycles.

Use of the porous material for the fastening tape makes it possible to separate the process of preparing the electrode roll (6) and the process of depositing lithium as shown in Example 14 (as for Example 7, lithium is pressure-bonded onto the negative electrode collector and therefore winding of the electrodes and deposition of lithium are carried out in the same process), thus providing higher degree of freedom in the manufacturing process.

Example 15

Seven cells were built similarly to Example 7 except for using a solution prepared by dissolving $LiPF_6$ in a solvent prepared by mixing ethylene carbonate, diethyl carbonate and propylene carbonate in proportions of 3:4:1, in a concentration of 1 mole/l was used as the electrolytic solution. After being left to stand at the room temperature for seven days, one of the capacitors was disassembled and showed complete disappearance of metal lithium. The ratio of the weight of the active material and the ratio of capacitance of the positive electrode to the negative electrode were similar to those of Example 7.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 23. Energy density and power density of this capacitor were 15 Wh/l and 650 W/l, respectively.

The above cycle was further repeated 100 times, and the cell capacity was determined to be 89 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 24. Energy density and power density of this capacitor were 16 Wh/l and 750 W/l, respectively.

The above cycle was further repeated 100 times, and the cell capacity was determined to be 98 mAh.

TABLE 23

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 89 | 82 | 75 | 43 |
| 2 | 88 | 82 | 76 | 42 |
| 3 | 88 | 80 | 74 | 42 |
| Average (n = 3) | 88 | 81 | 75 | 42 |

TABLE 24

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 96 | 89 | 81 | 48 |
| 5 | 97 | 90 | 83 | 47 |
| 6 | 96 | 90 | 82 | 47 |
| Average (n = 3) | 96 | 90 | 82 | 47 |

Example 16

A cell similar to that of Example 15 and a cell similar to that of Example 7 were built. After being left to stand at the room temperature for seven days, the capacitors were subjected to 3.3 V–1.6 V cycles similarly to Example 15 to measure the initial capacity (1st cycle) and the cell capacity after repeating 10000 cycles, with the results shown in Table 25.

TABLE 25

| No. | Example 15 | Example 17 |
|---|---|---|
| 1 | 89 | 90 |
| 10000 | 78 | 46 |

In was found that, compared to the capacitor that employs propylene carbonate only, the capacitor that uses the solution prepared by dissolving $LiPF_6$ in a solvent prepared by mixing ethylene carbonate, diethyl carbonate and propylene carbonate in proportions of 3:4:1, in a concentration of 1 mole/l as the electrolytic solution showed higher ratio of capacity retained after 10000 cycles.

Example 17

Seven cylindrical capacitors were built similarly to Example 7 except for using unwoven fabric of cellulose/rayon-based fiber having a thickness of 25 μm and a porosity of 60% as the separator. After being left to stand at the room temperature for seven days, one of the capacitors was disassembled and showed complete disappearance of metal lithium. The ratio of the weight of the active material and the ratio of capacitance of the positive electrode to the negative electrode were similar to those of Example 7.

Three out of the remaining six cells were charged with constant current of 1000 mA till the cell voltage reached 3.3 V, followed by charging with constant current at constant voltage with constant voltage of 3.3 V applied for one hour. The cells were then discharged with constant current of 100 mA till the voltage decreased to 1.6 V. This cycle of charge and discharge between 3.3 V and 1.6 V was repeated, and measurement of cell capacity upon the third discharge showed 90 mAh (mean value of three cells).

Then the capacity was measured by changing the discharge current as 180 mA (2C), 450 mA (5C), 900 mA (10C) and 4500 mA (50C), with the results shown in Table 26. Energy density and power density of this capacitor were 15 Wh/l and 650 W/l, respectively.

The above cycle was further repeated 100 times, and the cell capacity was determined to be 89 mAh.

The remaining three cells were charged with constant current of 1000 mA till the cell voltage reached 3.6 V, followed by charging with constant current at constant voltage with constant voltage of 3.6 V applied for one hour. The cells were then discharged with constant current of 100 mA till the voltage decreased to 1.6 V. This cycle of charge and discharge between 3.6 V and 1.6 V was repeated, and measurement of cell capacity upon the third discharge showed 100 mAh (mean value of three cells).

Then the capacity was measured by changing the discharge current as 200 mA (2C), 500 mA (5C), 1000 mA (10C) and 5000 mA (50C), with the results shown in Table 27. Energy density and power density of this capacitor were 16 Wh/l and 750 W/l, respectively.

The above cycle was further repeated 100 times, and the cell capacity was determined to be 98 mAh.

TABLE 26

Cell capacity with various discharge currents (unit: mAh)

| Sample No. | Discharge current | | | |
|---|---|---|---|---|
| | 2C (180 mA) | 5C (450 mA) | 10C (900 mA) | 50C (4500 mA) |
| 1 | 89 | 81 | 74 | 42 |
| 2 | 87 | 80 | 74 | 41 |
| 3 | 88 | 81 | 74 | 41 |
| Average (n = 3) | 88 | 81 | 74 | 41 |

TABLE 27

Cell capacity with various discharge currents (unit: mAh)

| Sample No. | Discharge current | | | |
|---|---|---|---|---|
| | 2C (200 mA) | 5C (500 mA) | 10C (1000 mA) | 50C (5000 mA) |
| 4 | 96 | 88 | 80 | 45 |
| 5 | 97 | 90 | 81 | 45 |
| 6 | 97 | 89 | 81 | 46 |
| Average (n = 3) | 97 | 89 | 81 | 45 |

What is claimed is:

1. An organic electrolytic capacitor comprising a positive electrode, a negative electrode and an aprotic organic solvent of a lithium salt as an electrolytic solution, wherein a positive electrode active material is an active material capable of reversibly holding lithium ions and anions, a negative electrode active material is an active material capable of reversibly holding lithium ions, capacitance per unit weight of the negative electrode active material is three times or higher as capacitance per unit weight of the positive electrode active material, the weight of the positive electrode active material is larger than the weight of the negative electrode active material, and the negative electrode is provided with lithium ions deposited thereon in advance.

2. The organic electrolytic capacitor according to claim 1, which is characterized by such a cell constitution as the positive electrode and the negative electrode are wound or stacked in three or more layers.

3. The organic electrolytic capacitor according to claim 1, wherein a positive electrode collector and a negative electrode collector have through holes that penetrate the thickness thereof so that lithium ions are deposited on the negative electrode in the cell through electrochemical contact of metal lithium and the negative electrode.

4. The organic electrolytic capacitor according to claim 3, wherein metal lithium is disposed so as to oppose the negative electrode or the positive electrode.

5. The organic electrolytic capacitor according to claim 1, wherein a withstanding voltage of the capacitor is higher than 3.3 V.

6. The organic electrolytic capacitor according to claim 1, wherein the positive electrode collector is coated with a carbon-based electro-conductive paste on the surface thereof.

7. The organic electrolytic capacitor according to claim 1, wherein the negative electrode collector is coated with a carbon-based electrically conductive coating material on the surface thereof.

8. The organic electrolytic capacitor according to claim 3, wherein the positive electrode collector foil surface is coated with a carbon-based electro-conductive paste and then punched or expanded so as to form through holes that penetrate the thickness thereof.

9. The organic electrolytic capacitor according to claim 3, wherein the negative electrode collector foil surface is coated with a carbon-based electrically conductive coating material and then punched or expanded so as to form through holes that penetrate the thickness thereof.

10. The organic electrolytic capacitor according to claim 3, wherein the positive electrode and the negative electrode are wound or stacked via a separator to build a cell, while the stack or roll is fastened by means of a porous tape.

11. The organic electrolytic capacitor according to claim 1, wherein the aprotic organic solvent is a mixture of ethylene carbonate, diethyl carbonate and propylene carbonate, while a proportion of propylene carbonate is 25% by weight or less of the whole and a ratio of ethylene carbonate to diethyl carbonate is in a range from 70/30 to 30/70.

12. The organic electrolytic capacitor according to claim 1, wherein a thickness of the separator is in a range from 4% to 15% of the total thickness of the positive electrode and the negative electrode, and a porosity of the separator is in a range from 50% to 80%.

13. An organic electrolytic capacitor wherein the negative electrode active material according to claim 1 is an insoluble and infusible substrate that is obtained by applying a heat treatment to an aromatic condensation polymer and has a polyacene skeletal structure in which a ratio of hydrogen atoms to carbon atoms is in a range from 0.50 to 0.05.

* * * * *